July 24, 1923.

E. J. WELFFENS 1,462,950

PLANETARY GEARING

Filed July 3, 1922

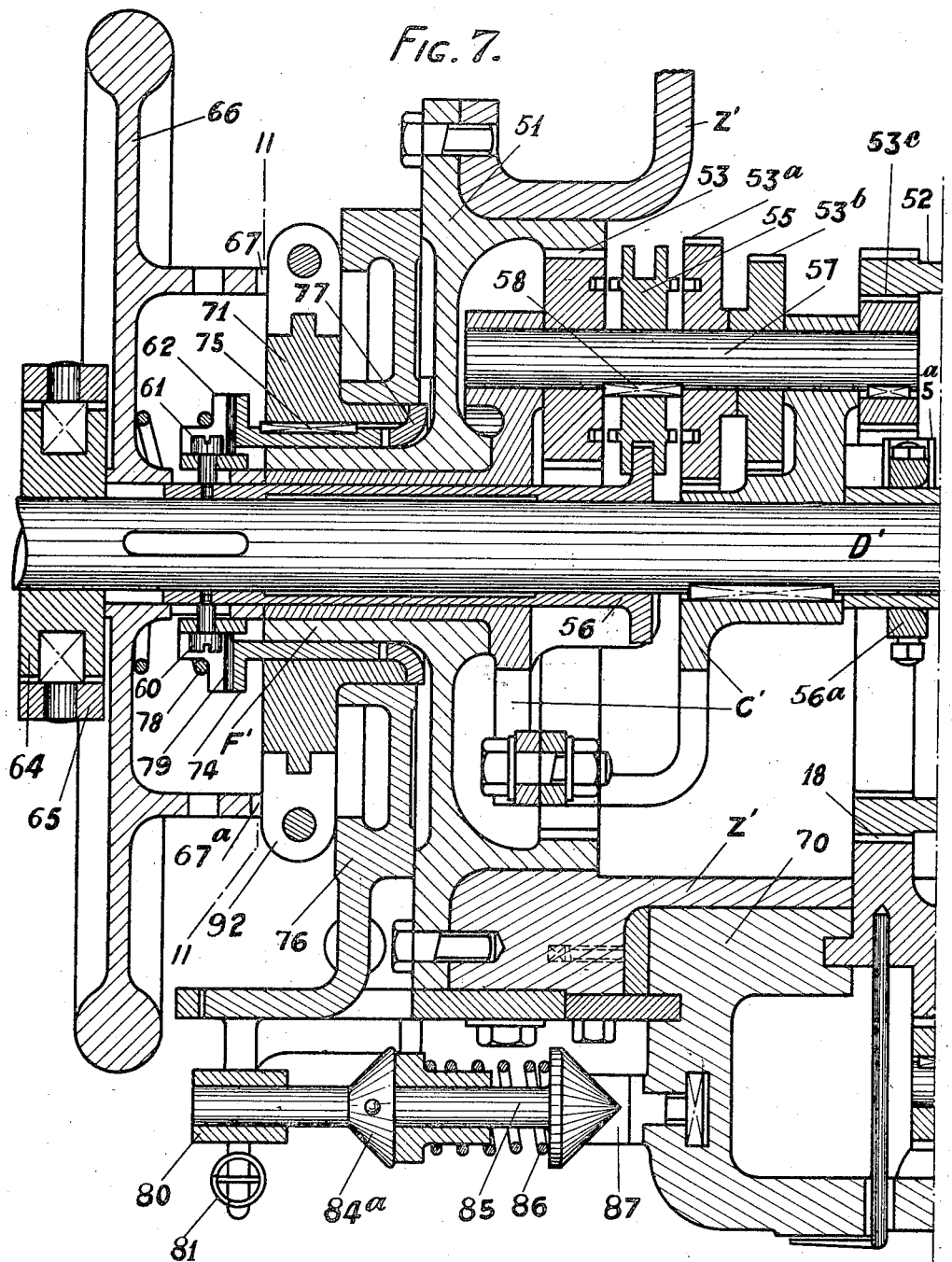

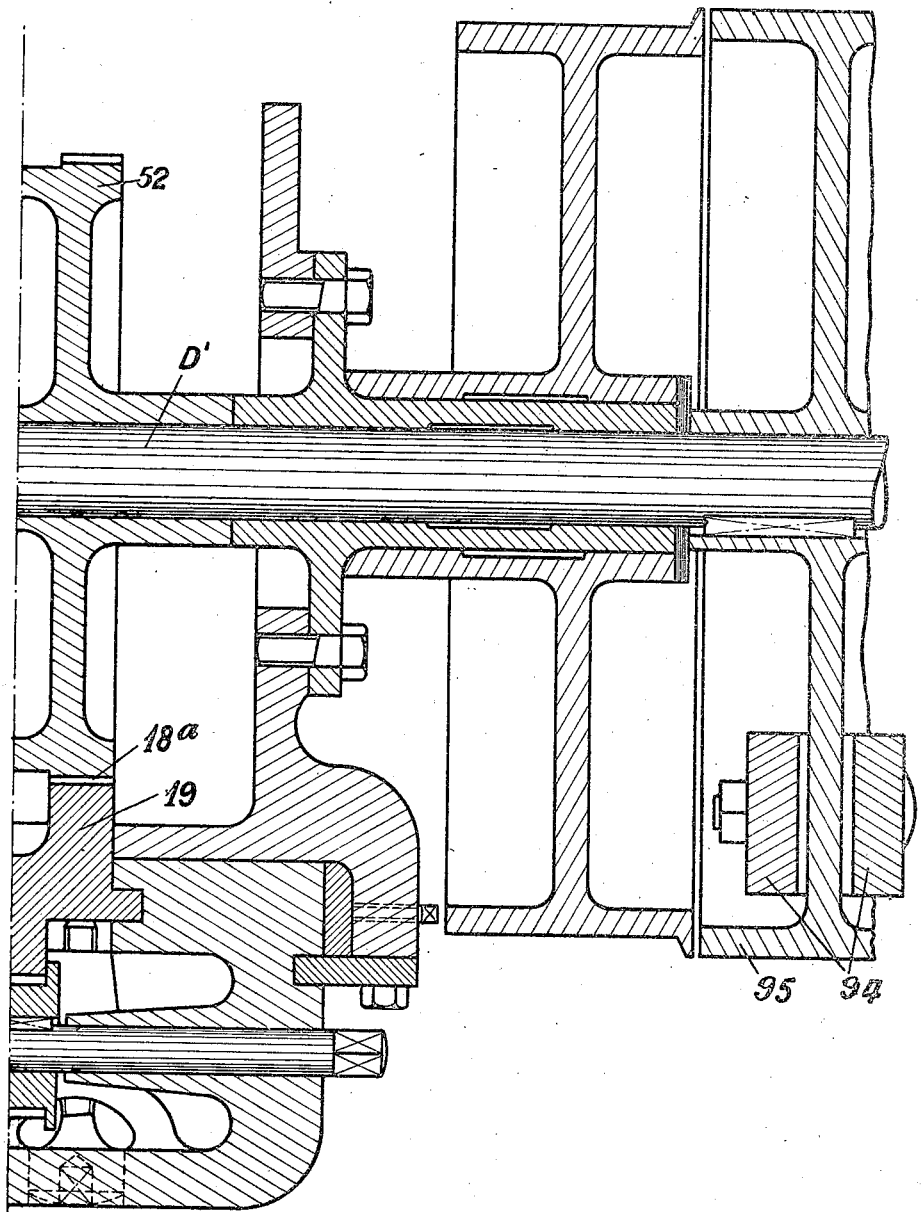
FIG.7 .cont<sup>d</sup>

July 24, 1923.

E. J. WELFFENS

PLANETARY GEARING

Filed July 3, 1922      9 Sheets-Sheet 7

1,462,950

INVENTOR:
Emile J. Welffens
BY Wm Wallace White
ATT'Y.

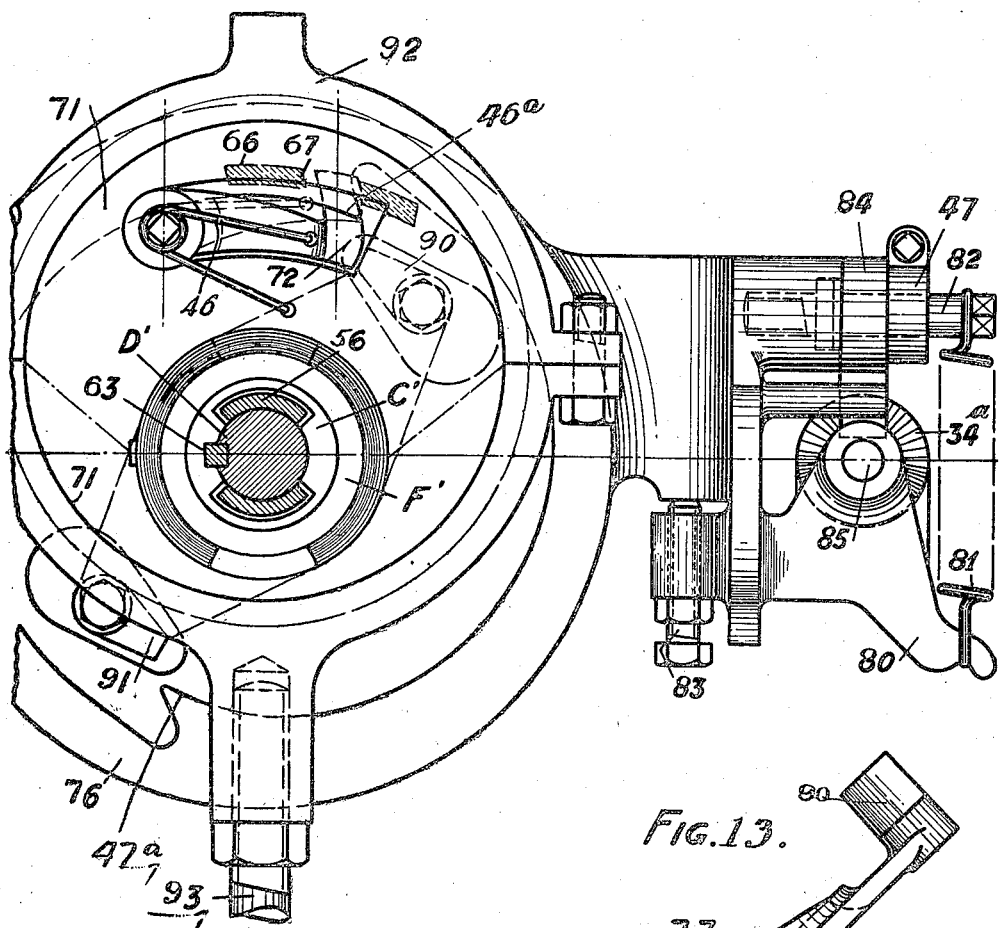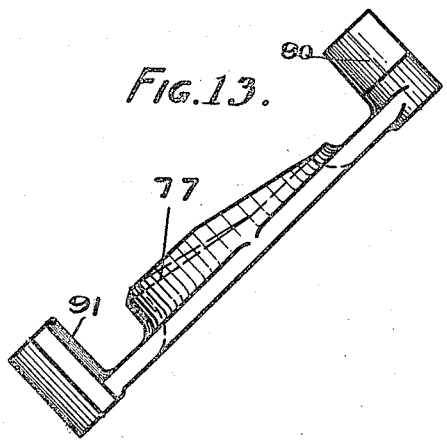

July 24, 1923.
E. J. WELFFENS
PLANETARY GEARING
Filed July 3, 1922
1,462,950
9 Sheets-Sheet 9
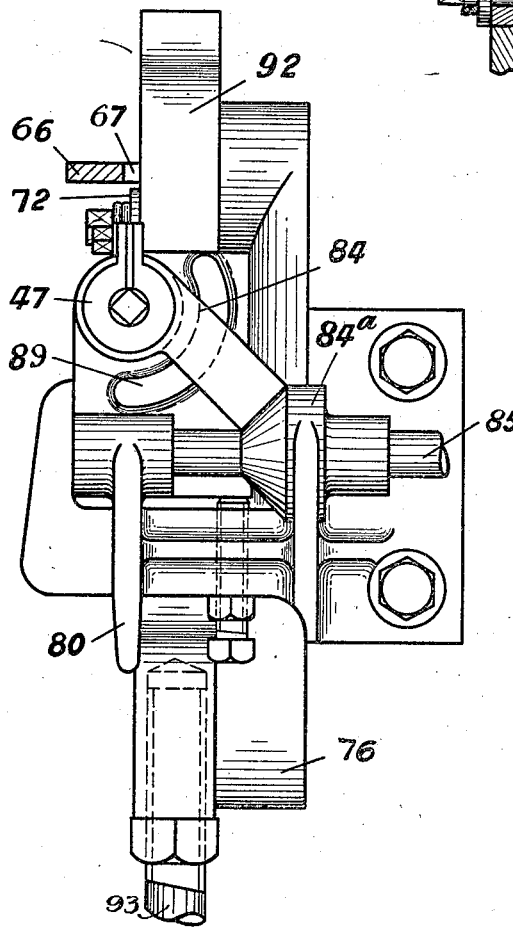
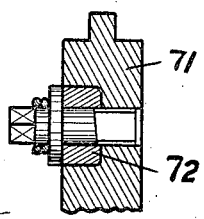
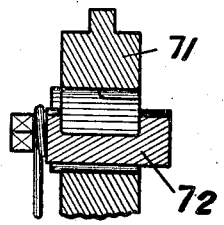
INVENTOR:
Emile J. Welffens
By Wm Wallace White
ATT'Y.

Patented July 24, 1923.

1,462,950

UNITED STATES PATENT OFFICE.

EMILE JOHN WELFFENS, OF WITHINGTON, MANCHESTER, ENGLAND.

PLANETARY GEARING.

Application filed July 3, 1922. Serial No. 572,705.

*To all whom it may concern:*

Be it known that I, EMILE JOHN WELFFENS, a subject of the King of the Belgians, residing at 8 Mauldeth Road West, Withington, Manchester, in the county of Lancaster, England, have invented new and useful Improvements in Planetary Gearing, of which the following is a specification.

The invention relates to planetary gearing.

The object of the present invention is to improve the construction of planetary gearing, hypocyclic in action and to afford reduction in speed and by positive planetary clutch action reversal of motion as well as variation in speed while maintaining uninterruptedly relative continuity of motion.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of advantages of the invention.

In the drawings, in which like characters of reference designate corresponding parts in the several views:—

Figure 7 is a longitudinal sectional view of a speed reduction, speed change and controlled planetary gearing shown applied to a shaping and slotting machine.

Figure 11 is a detail transverse sectional view taken substantially on the line II—II of Figure 7.

Figure 12 is a detail plan view of a portion of the mechanism shown in Figure 11.

Figure 13 is a detail view of the stationary cam.

Figures 14 and 15 are detail sectional views of the clutch pawl.

In the accompanying drawings is illustrated the preferred embodiment of the invention.

Figure 1:
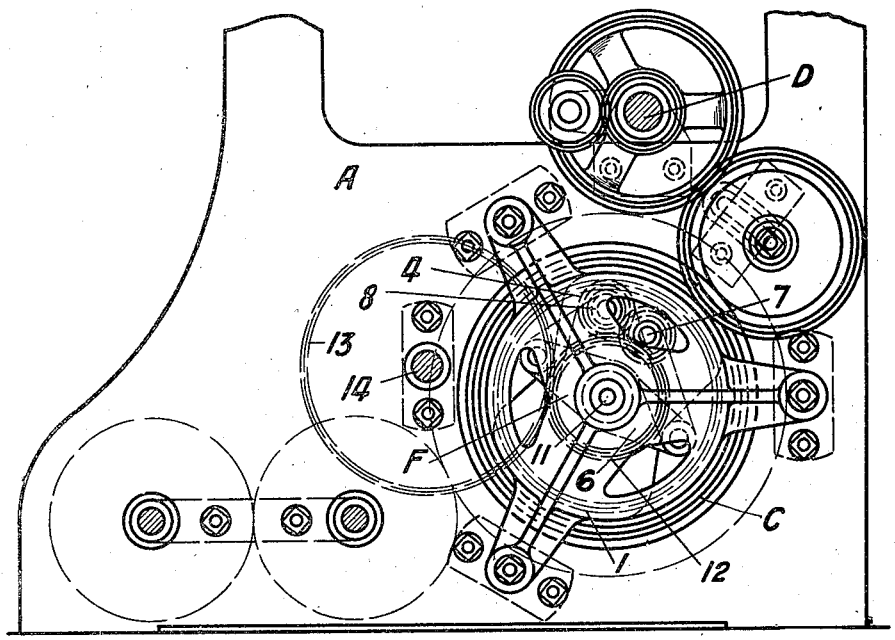
Figure 1 is an elevation of a planetary speed reducing and reversing gear applied to a flier spinning machine.
Figure 2:
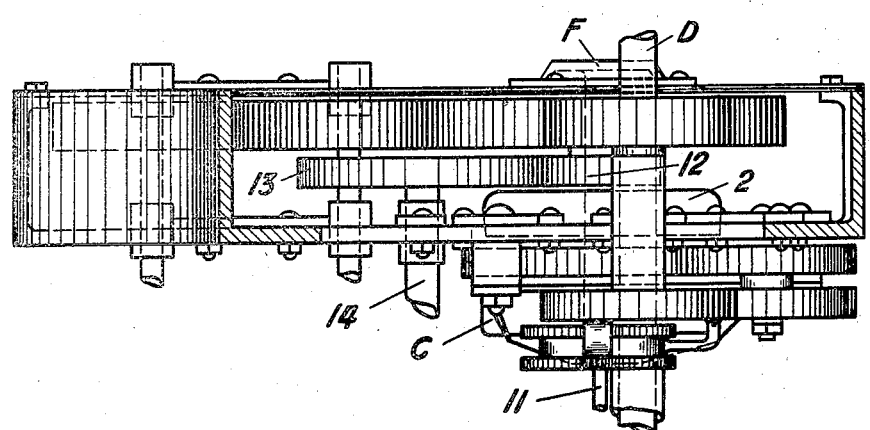
Figure 2 is a plan view of the same.
Figure 3:
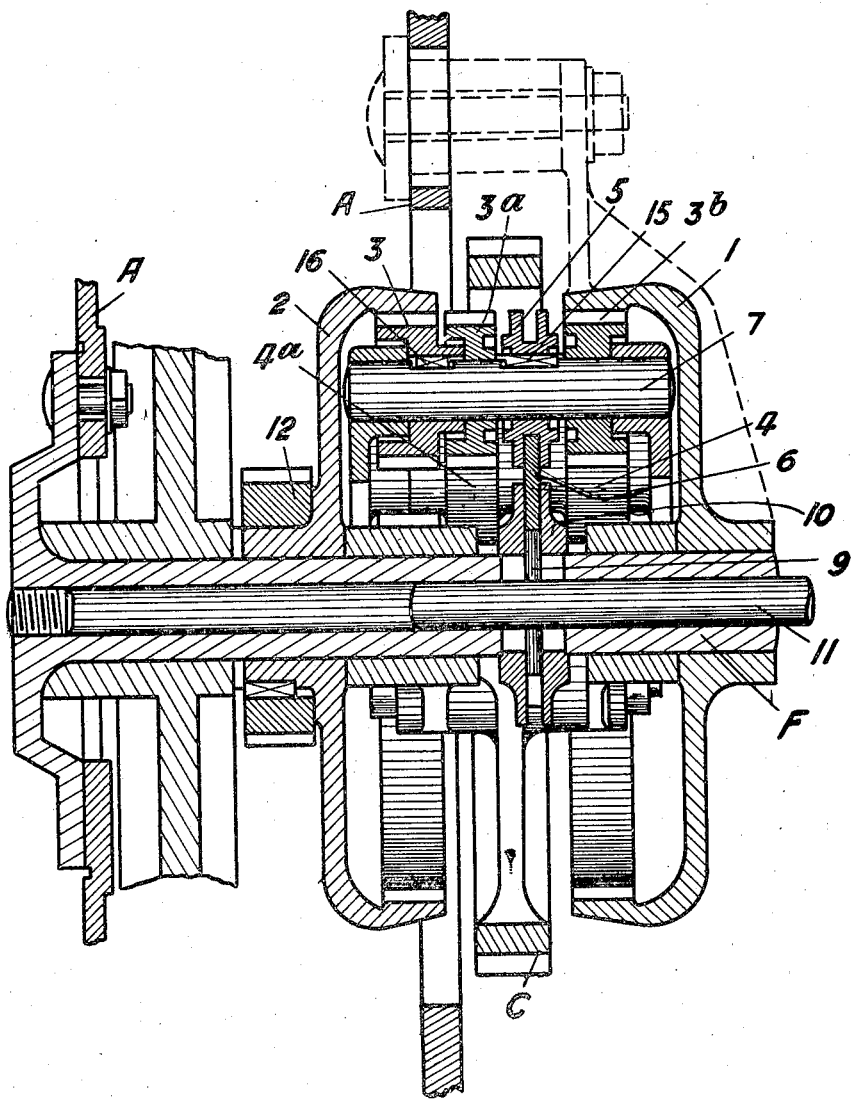
Figure 3 is a longitudinal sectional view thereof.

Figures 1 to 3, inclusive, show a hypocyclic action planetary speed reducing and reversing gear applied to a flier spinning machine. Only one driven wheel 2 is used and reversal of motion, as well as approximate equality of peripheral velocity between the clutching members is obtained by using satellite gears in addition to planetary pinions and clutches. The satellite gears constitute a second set of planetary pinions, two sets of planetary pinions being employed and one of the sets being termed satellite gears for convenience in describing the mechanism. A designates the gearing end of the machine having a stationary orbit wheel 1 fixed to it. The driven wheel 2 is revolubly mounted upon a tubular bearing F and a pinion 12 is keyed to the driven wheel 2 and meshes with a wheel 13 fixed to a shaft 14. A composite driving wheel C is driven from the shaft D and carries pinions 3, $3^a$ and $3^b$ and a clutch 5, which is mounted upon a stud 7. The composite driving wheel also carries a satellite gear having gear elements or crowns 4 and $4^a$ and mounted revolubly upon a stud 8. The pinions $3^a$ and $3^b$ are provided with lateral clutch teeth and are revolubly arranged on the said stud 7, while the pinion 3 is fixed to the stud 7 by means of a key 16. The clutch 5 is slidably interlocked with the stud 7 by a key 15 and is operated by means of a fork 6, composed of a pin 9 and a ring 10 and connected with a rod 11 and slidably arranged in the tubular bearing F and designed to be connected with the operating mechanism of the machine. The pinion 3 meshes with the driven wheel 2, the pinion 3ª meshes with the gear element or crown 4ª and the pinion 3ᵇ meshes with the gear element or crown 4 and the stationary orbit gear 1. With the orbit wheel 1 provided with 72 teeth and the wheel 2 with 64 teeth, the pinion 3 with 20 teeth, the pinion 3ª with 21 teeth, the crown gear 4 with 27 teeth, the pinion 3ᵇ with 20 teeth and crown gear 4ª with 20 teeth, a wheel combination is obtained affording an 8 to 1 speed reduction by reversal of motion. The clutch and planetary pinions run at high peripheral velocities and as their velocities approximate one another closely a relative continuity of motion results uninterruptedly, and all gears or members, except the driven wheel 2, run constantly in the same direction. By clutching the pinion 3ᵇ to the stud or spindle 7 a direct drive from pinion 3ᵇ to pinion 3 is obtained and the driven wheel 2 is rotated in one direction, while by clutching the pinion 3ª to the stud or spindle 7 a drive through pinion 3ᵇ, crown gears 4 and 4ª, pinion 3ª and pinion 3 is obtained with a consequent rotation of the driven wheel in the opposite direction.

Figure 4:
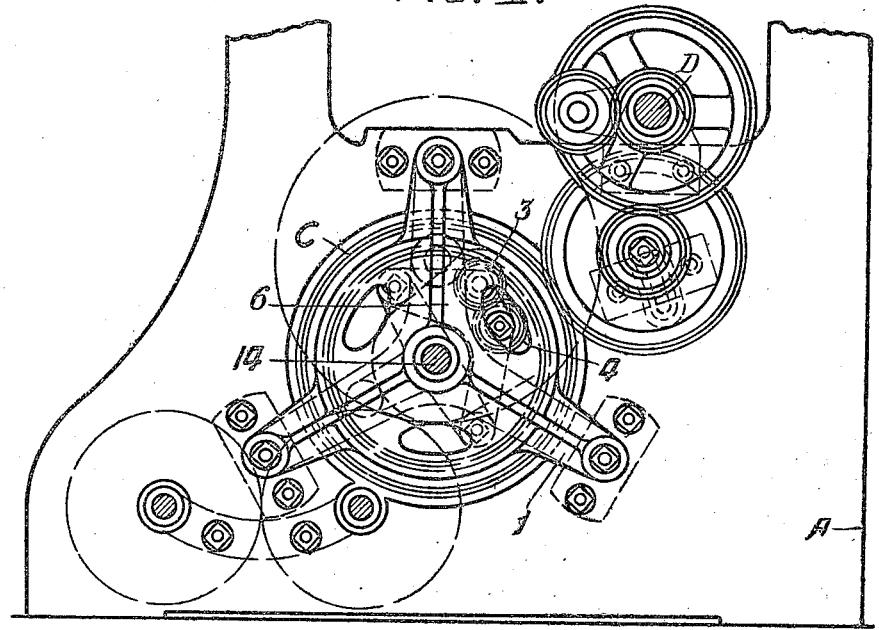
Figure 4 is an elevation of a planetary gear, similar to that shown in Figures 1 to 3, inclusive, and having the driven wheel fixed directly to the lifter shaft.
Figure 5:
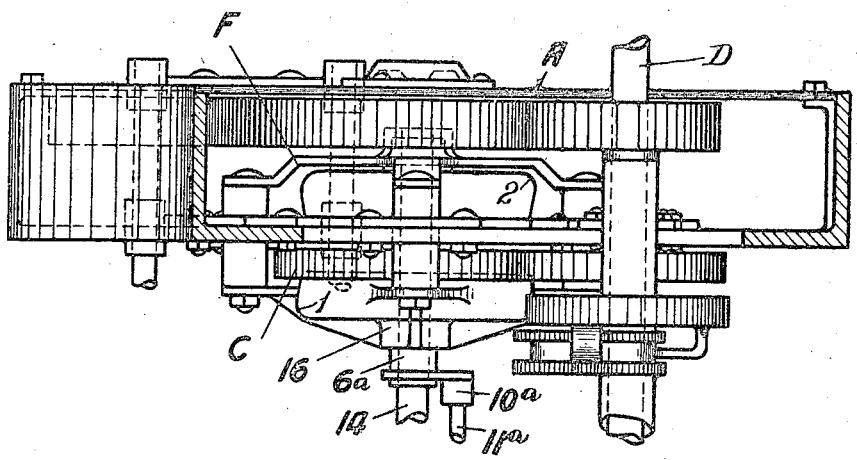
Figure 5 is a plan view of the same.
Figure 6:
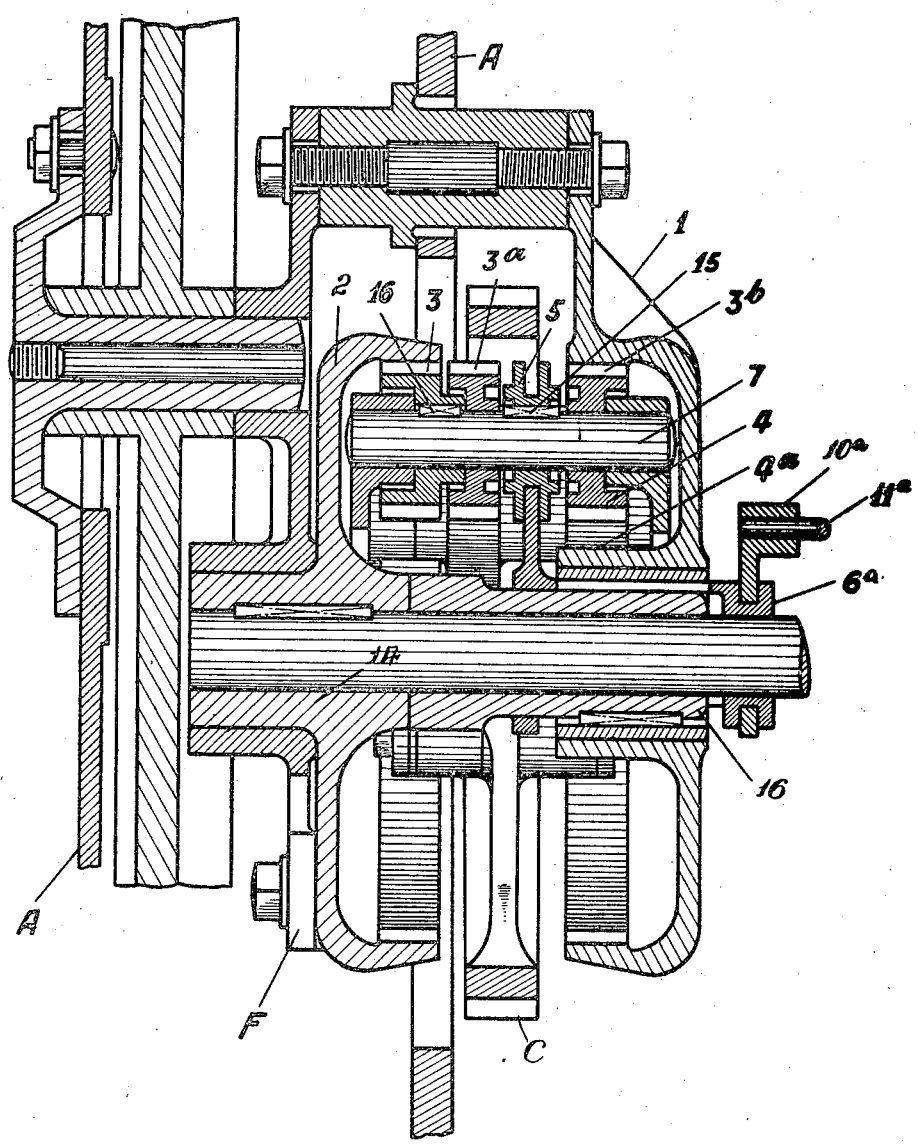
Figure 6 is a longitudinal sectional view of the planetary gearing, shown in Figure 4.
Figure 8:
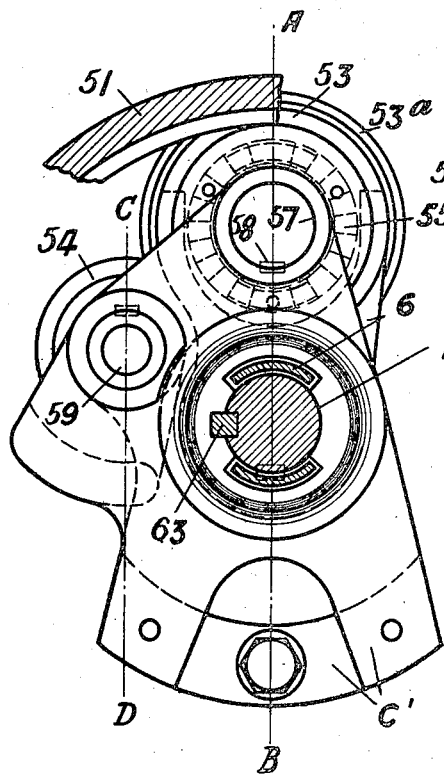
Figures 8 and 9 are detail vertical sectional views illustrating the arrangement of the planetary gears and clutch.
Figure 9:
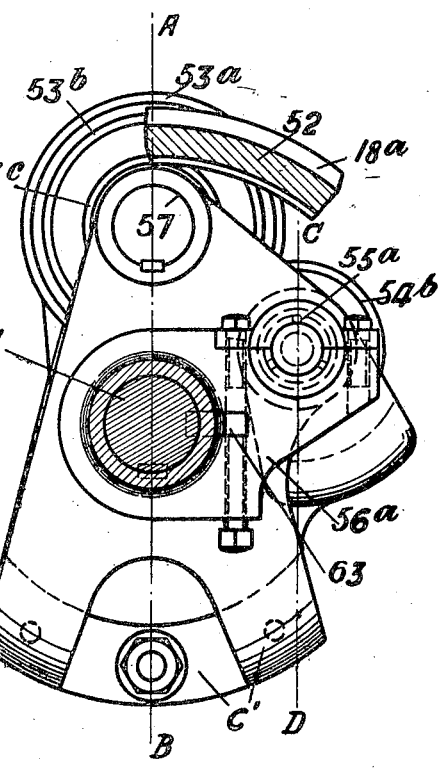
Figure 10:
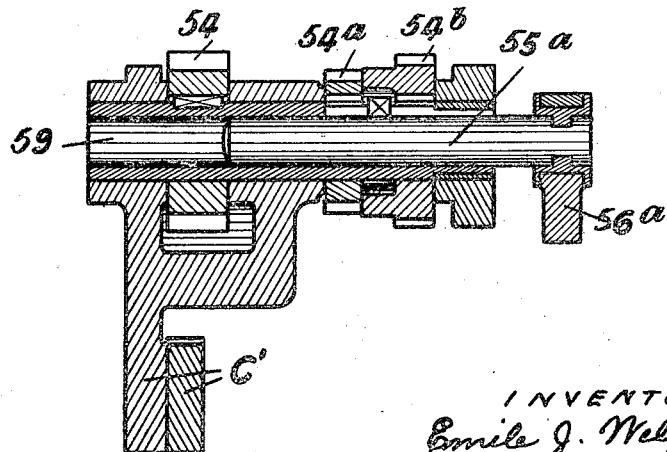
Figure 10 is a detail sectional view, illustrating the arrangement of the satellite gears.

In the form of the invention, illustrated in Figures 4 to 6, inclusive, the driven wheel 2 is fixed directly to the lifter shaft 14 and the means for operating the clutch is different from the construction illustrated in Figures 1 to 3, inclusive and affords a more convenient and cheaper construction of clutch operating mechanism. The clutch 5 is connected to a fork 6ª passing through a composite boss 16 of a driving wheel C and is grooved to receive a collar 10ª, which is connected with a rod 11ª.

Referring to Figures 7 to 15, inclusive, 51 designates a stationary orbit wheel fixed to a frame or bed Z′ and provided with a hub extension forming a bearing F′ for a driving shaft D′ and other members hereinafter described. A driven wheel 52, which is revolubly mounted upon the driving shaft D′, has two wheel crowns 18 and 18ª upon its periphery, which mesh with a rack 19, adjustably fixed to a ram 70. A composite member C′ is fixed to the driving shaft D′ and carries driving pinions 53, 53ª, 53ᵇ and 53ᶜ, clutches 55 and 55ª and satellite gears 54, 54ª and 54ᵇ. A stud or spindle 57 carries pinions 53, 53ª and 53ᵇ revolubly and has pinion 53ᶜ keyed to it. The clutch 55 is slidably interlocked with the stud or spindle by means of a key 58. The pinions 53 and 53ª are provided with clutch teeth on one of their faces and pinion 53ᵇ is fixed to the pinion 53ª. A hollow stud or spindle 59 carries the satellite gears 54, 54ª and 54ᵇ and the clutch 55ª. The satellite gears 54ª and 54ᵇ are revolubly arranged on the hollow stud or spindle 59 and are provided with clutch teeth in their bores. The satellite gear 54 is keyed to the hollow stud or spindle 59 and the clutch 55ª is slidably interlocked with the stud or spindle 59 in the bore thereof. The clutch fork 56 engages, at its inner portion, the clutch 55 and its outer extremity is secured by screws 60 and 61 to a ring 62. The clutch fork 56ª revolubly engages the clutch 55ª, which is in the form of a stud and is connected by a square rod 63 with a ring 64. The rod 63 is slidably mounted in the shaft D′ and is actuated by a lever 65 movably mounted on the frame Z′ and pivotally connected to the said ring 64.

The clutch fork 56 is operated by means of a special mechanism controlled by stops 87 on the ram 70 and actuated through a fly wheel 66 from the driving shaft D′. The fly wheel 66 is provided with a drum having one or more notches 67 and 67ª adapted to be engaged by a clutch pawl 72. A disk 71 carries the pawl 72 and a bushing 74 movably connected to the disk 71 by means of a key 75 and revolubly mounted upon a bearing F′. A double circular cam 76 engages the pawl 72 and is mounted revolubly upon the bearing disk 71.

One extremity of the bushing 74 has a cam like face engaging the stationary cam 77 fixed to the stationary orbit wheel 51. The bushing 74 is forced against the cam 77 by a spring 78, which also presses ring 62 against the bushing 74, an anti-friction washer 79 being interposed between the bushing 74 and the ring 62. The circular cam 76 is pulled against the bracket 80 by means of a spiral spring 81 connected to the stud 82 and the bracket 80 respectively and adjusted for position by means of a screw 83 mounted in the bracket 80. The bracket 80 is mounted on the frame Z′ and the cam 76 carries a rocking lever 84 revolubly mounted on the stud 82 and actuated by the cam face 84ª of the cam stud 85. The cam stud 85 is revolubly carried in the bracket 80 and is forced by the spring 86 towards the stops 87 adjustably mounted in a slot in the ram 70. The gravity rocking latch 84 normally rests against the projection 89 on the cam 76 and it is free to rotate in the opposite direction around the stud 82. Stops 90 and 91 are provided for the pawl 72 and are mounted on the stationary orbit wheel 1, and are a part of the stationary cam 77, as clearly illustrated in Figures 11 and 13 of the drawings.

The disk 71 is eccentric and a split ring 92 engages its circumference and adjustably carries a rod 93 which serves to operate the feed of the machine in any suitable manner. An adjustable balance weight 94 is fixed to a fast pulley 95 which is fast on the shaft D′.

Having thus described the combination parts of the invention, the action of the arrangement which it is intended to give, besides speed reduction, two cutting speeds and a constant accelerated return speed to the ram 20, will now be explained.

Assuming a constant speed in one direction of 450 revolutions per minute, cutting speeds of 45 and 90 feet, a return speed of 120 feet per minute and a driven wheel with a pitch line circumference of 3 feet, speed reductions of 30 to 1, 15 to 1 and a 11.25 to 1 are required. These are obtained substantially with the orbit wheel 51 with 98 teeth, wheel 52 with 20 teeth, pinion 53 with 23 teeth, satellite gear 54 with 23 teeth, pinion $53^a$ with 35 teeth, satellite $54^a$ with 30 teeth, pinion $53^b$ with 36 teeth, satellite $54^b$ with 32 teeth and pinion $53^c$ with 23 teeth. Pinion 53 meshes with the stationary orbit wheel 51 and with satellite 54; pinion $53^a$ meshes with satellite $54^a$; pinion $53^b$ meshes with satellite $54^b$ and pinion $53^c$ meshes with the driven wheel 52.

For a return movement pinion 53 is clutched to the stud or spindle 57 by the clutch 55 and consequently to pinion $53^c$. In one revolution pinion 53 rolls around 98 teeth on orbit wheel 51; pinions 53 and $53^c$ having an equal number of teeth and the driven wheel 2 has 90 teeth and it will, therefore, move 8 teeth (90 : 8 :: 11.25 : 1) in return direction. Quick cutting obtains with pinion $53^a$ clutched to stud or spindle 57 by clutch 55 and satellite gear $54^a$ is clutched to stud or spindle 59 by the clutch $55^a$ and this arrangement will in one revolution of the shaft D' cause the pinion $53^c$ to turn 84 teeth or six less than the number of teeth on the driven wheel 52, and, therefore, to rotate driven wheel 52 six teeth in cutting direction (96 : 6 :: 15 : 1). Slow cutting is obtained with pinion $53^a$ and consequently pinion $53^b$ clutched to stud or spindle 57 by clutch 55 and satellite gear $54^b$ clutched to stud or spindle 59 by clutch $55^a$, and this arrangement causes pinion $53^c$ to turn 87 teeth in each revolution of the shaft D' or three less than the number of teeth on the driven wheel 52, which driven wheel will, therefore, rotate three teeth, cutting direction (90 : 3 :: 30 : 1). Satellite gears $54^a$ and $54^b$ are clutched to the stud or spindle 59 by means of the hand lever 65.

Reversal is as follows:—Assuming that the machine is at the end of the return stroke, the stop 87 strikes and pushes stud 85 and consequently pushes face $84^a$ towards latch 84 solidly against the projection 89 and the latch is forced to rise and thereby rotate circular cam 76. As shown in Figure 11 the pawl 72 is normally pressed down against stop 90 or 91 by cam face $46^a$ or $47^a$. As soon as the partial rotation of the cam 76 releases pawl 72 the latter is thrown outward through the action of the spring 46 and it is caused to engage one of the notches 67 and $67^a$, provided in the face of the drum of the fly wheel 66. As the fly wheel 66 is fixed to the driving shaft D' the fly wheel carries the disk 71 with it and partially rotates the sleeve 74 which is caused through the pressure of the spring 78 to slide inwardly against the cam 77. The ring 62, the clutch fork 66 and the clutch 55 are likewise moved inwardly, thereby disengaging clutch 55 from the pinion 53 and engaging the said clutch 55 with the pinion $53^a$. The disk 71 rotates through one-half of a revolution as the pawl 72 is disengaged from the notch 67 or $67^a$ of the drum of the fly wheel 66 by the cam 76, as the cam face thereof, diametrically opposite the cam face which released the pawl 72, will engage the said pawl 72 and depress the same and move the same out of engagement with the drum of the fly wheel.

If the pawl 72 is released by the cam face $47^a$ at the bottom of the cam 76 in Figure 11 of the drawings it will be again released only when the pawl 72 engages with the cam face $46^a$ at the top of the cam 76. In that position the latch or lever 84 flies past the bevel or cam face $84^a$ and the spring 81 instantly pulls the cam 76 against the bracket 80. The cam face $47^a$ will, therefore, catch the pawl 72 before a half revolution is made and will force the pawl out of engagement with the drum of the fly wheel 86 and bring the disk 71 to rest against the stop 91. The ring 92 and the rod 93 have moved downwardly with the disk 71 feeding the machine for the next cutting stroke. As soon as the ram moves, cutting direction stud 85 is released and by means of the spring 86 is pushed into its normal position, which causes the latch or lever 84, maintained in position by the ring 97, to drop likewise into its normal position.

This complete cycle of operation has lasted but one-half of a revolution of the main shaft D', approximately $\frac{1}{15}$ of a second, and the same cycle of operation will be repeated when the other stop 87 actuates the stud 85, except that the sliding sleeve 74, being actuated by the stationary cam 77 will be moved outwardly and will carry with it the clutch and cause the same to engage the pinion 53. The ring 92 and the rod 93, without any effect on the feeding mechanism, will move upwardly ready for the next feeding stroke.

The reversing mechanism is operated by the main shaft and acts practically instantaneously, all motion, with the exception of the driven wheel 52, being constantly in the same direction and the hypocyclic action secures high peripheral operating speeds and all peripheral clutch velocities closely approximate one another. The clutch action will, therefore, be practically instantaneous, easy, smooth and silent and accurate ram travel will be obtained. The concentric arrangement of the complete construction results in constricted design, good mechanical efficiency, and favorable operating conditions.

The various members may be constructed in a variety of ways to meet requirements. Spur or spiral wheels, or both, may be used and cut with normal or abnormal pitches in order to obtain the nearly equal pitch diameters desired. The clutch teeth may be square, or any other desired shape, and the clutch fork may be of any design to meet conditions obtaining and any suitable arrangement may be used to connect the clutch fork or forks to the operating mechanism and any desired number of clutches and pinions may be used to provide the desired power transmission capacity of the combinations.

What is claimed is:—

1. Planetary gearing, comprising a drive shaft, a stationary orbit wheel arranged on the drive shaft, a rotary member mounted on and actuated by the drive shaft, a rotary driven element loose on the drive shaft, a set of planetary pinions carried by the rotary member, certain of the pinions meshing with the orbit wheel and the driven element, a second set of planetary pinions meshing with pinions of the first set, and planetary clutch mechanism for controlling the pinions to vary the speed and change the direction of rotation of the driven element.

2. Planetary gearing, including a drive shaft, a stationary orbit wheel arranged on the drive shaft, a rotary driven element loose on the drive shaft, a rotary member mounted on and actuated by the drive shaft, a set of planetary pinions carried by the rotary member, certain of the pinions meshing with the orbit wheel and the driven element, a second set of planetary pinions meshing with pinions of the first set, and separate planetary clutches associated with the sets of planetary pinions for controlling the same to vary the speed and change the direction of rotation of the driven element.

3. Planetary gearing, comprising a stationary orbit wheel, a drive shaft, a rotary driven element loose on the drive shaft, a rotary member mounted on and actuated by the drive shaft, a spindle carried by the rotary member, a set of planetary pinions mounted on the spindle, certain of the pinions meshing with the orbit wheel and the driven element, a second set of planetary pinions mounted on the rotary member and meshing with pinions of the first set to vary the speed and change the direction of rotation of the driven element, and planetary clutch mechanism for controlling planetary pinions.

4. Planetary gearing, comprising a stationary orbit wheel, a drive shaft, a driven gear loose on the drive shaft, a rotary member mounted on and actuated by the drive shaft, spindles carried by the rotary member, a set of planetary pinions mounted on one of the spindles, certain of the planetary pinions meshing with the orbit wheel and the driven gear, a second set of planetary pinions mounted on the other spindle and meshing with pinions of the first set, and planetary clutches carried by the spindles for controlling planetary pinions of the said sets to vary the speed and change the direction of rotation of the driven element.

5. Planetary gearing, comprising a stationary orbit wheel, a drive shaft, a driven gear loose on the drive shaft, a rotary member mounted on and actuated by the drive shaft, spindles carried by the rotary member, a set of planetary pinions mounted on one of the spindles, certain of the pinions meshing with the orbit wheel and the driven gear, a second set of planetary pinions mounted on the other spindles and meshing with planetary pinions of the first set, planetary clutches carried by the spindles for controlling planetary pinions of the said sets to vary the speed and change the direction of rotation of the driven gear, manually operable means for controlling one of the clutches, and automatically operable means for controlling the other clutch.

6. Planetary gearing, comprising a stationary orbit wheel, a drive shaft, a driven gear mounted on the said shaft and provided with internal and external teeth, a rotary member mounted on and actuated by the drive shaft, a set of planetary pinions mounted on the rotary member, certain of the planetary pinions meshing with the stationary orbit wheel and the driven gear interiorly thereof, a second set of planetary pinions meshing with pinions of the first set, planetary clutch mechanism for controlling certain of the pinions to change the direction of rotation of the driven gear, and means for automatically operating the clutch, including a rack engaged by the exterior teeth of the driven gear, and mechanism operated by the rack for shifting the clutch mechanism at the end of each stroke of the rack.

7. Planetary gearing, comprising a drive shaft, a stationary orbit wheel, a driven gear mounted on said shaft and provided with internal and external teeth, a rotary member mounted on and actuated by the drive shaft, a set of planetary pinions mounted on the rotary member, certain of the pinions meshing with the orbit wheel and the driven gear interiorly thereof, planetary clutch mechanism for controlling pinions of one set to change the direction of rotation of the driven gear, means for automatically operating the clutch, including a rack engaged by the exterior teeth of the driven wheel, and mechanism operated by the rack for shifting the planetary clutch mechanism at the end of each stroke of the rack, and a second planetary clutch for controlling pinions of the other set of gears to vary the speed of the driven gear and manually operable means for shifting the latter clutch.

8. Planetary gearing, including a drive shaft, a stationary orbit wheel, a driven gear loosely mounted on the drive shaft, a rotary member mounted on and actuated by the drive shaft, a set of planetary pinions carried by the rotary member, certain of the pinions meshing with the orbit wheel and the driven gear, a second set of planetary pinions meshing with pinions of the first set, planetary clutch mechanism for controlling certain of the planetary pinions to vary the speed and change the direction of rotation of the driven gear, a fly wheel fixed to the drive shaft, a rotary element mounted on the drive shaft and provided with a slidable sleeve, means for connecting the planetary clutch mechanism with the slidable sleeve, a cam for actuating the slidable sleeve in one direction, yieldable means for moving the slidable sleeve in the opposite direction, and means for automatically connecting the rotary element with the fly wheel and for disconnecting it therefrom intermittently.

9. Planetary gearing, including a drive shaft, a stationary orbit wheel, a driven gear loose on the drive shaft, a rotary member mounted on and actuated by the drive shaft, a set of planetary pinions carried by the rotary member, certain of the pinions meshing with the orbit wheel and the driven gear, a second set of planetary pinions carried by the rotary member and meshing with pinions of the first set, planetary clutch mechanism for controlling certain of the pinions to vary the speed and change the direction of rotation of the driven gear, a fly wheel fixed to the drive shaft, a rotary element mounted on the drive shaft and provided with a slidable sleeve, means for connecting the planetary clutch mechanism with the slidable sleeve, a cam for actuating the slidable sleeve in one direction, yieldable means for moving the slidable sleeve in the opposite direction, and means actuated by the driven gear for intermittently connecting the rotary element with and disconnecting it from the fly wheel.

10. Planetary gearing, including a drive shaft, a stationary orbit wheel, a driven gear loosely mounted on the drive shaft, a rotary member mounted on and actuated by the drive shaft, a set of planetary pinions carried by the rotary member, certain of the pinions meshing with the orbit wheel and the driven gear, a second set of pinions mounted on the rotary member and meshing with pinions of the first set, planetary clutch mechanism for controlling certain of the pinions to vary the speed and direction of rotation of the driven gear, a fly wheel fixed to the drive shaft, a rotary element mounted on the drive shaft and provided with a slidable sleeve, means for connecting the planetary clutch mechanism with the slidable sleeve, a cam for actuating the slidable sleeve in one direction, yieldable means for moving the slidable sleeve in the opposite direction, a slidable rack meshing with the driven gear, spaced stops connected with and carried by the rack, and means alternately actuated by said stops for intermittently connecting the rotary element with the fly wheel and for disconnecting it therefrom.

11. Planetary gearing, comprising a drive shaft, a stationary orbit wheel, a driven gear mounted on the drive shaft, a rotary member mounted on and actuated by the drive shaft, a set of planetary pinions carried by the rotary member, certain of the pinions meshing with the orbit wheel and the driven gear, a second set of pinions also carried by the rotary member and meshing with pinions of the first set, planetary clutch mechanism for controlling certain of the pinions to vary the speed and change the direction of rotation of the driven gear, a disk provided with a slidable sleeve connected with the planetary clutch mechanism, a spring for moving the sleeve in one direction, a stationary cam for sliding the sleeve in the opposite direction, a fly wheel, a spring actuated pawl carried by the disk for engaging the fly wheel to connect the disk therewith, a cam member mounted on the disk and provided with cam faces arranged to engage the pawl for moving the same out of engagement with the fly wheel, and means for automatically shifting the cam member to release the pawl at intervals to produce an intermittent rotary movement of the disk.

12. Planetary gearing comprising a drive shaft, a stationary orbit wheel, a driven gear loose on the drive shaft, a rotary member mounted on and actuated by the drive shaft, a set of planetary pinions carried by the rotary member, certain of the pinions meshing with the orbit wheel and the driven gear, a second set of planetary pinions carried by the rotary member and meshing with pinions of the first set, planetary clutch mechanism for controlling certain of the pinions to vary the speed and change the direction of rotation of the driven gear, a disk provided with a slidable sleeve connected with the planetary clutch mechanism, a spring for moving the sleeve in one direction, a stationary cam for sliding the sleeve in the opposite direction, a fly wheel, a spring actuated pawl carried by the disk for engaging the fly wheel to connect the disk therewith, a cam member mounted on the disk and provided with cam faces arranged to engage the pawl for moving the same out of engagement with the fly wheel, a rack meshing with the driven gear, spaced stops connected with and operated by the rack, a spring pressed stud arranged to be engaged and actuated by said stops, and a pivot latch mounted on the cam member and arranged to be engaged by said stud for shifting the cam member to release the said pawl.

In testimony whereof I have signed my name to this specification.

EMILE JOHN WELFFENS.